(12) United States Patent
Hagerman et al.

(10) Patent No.: US 6,577,879 B1
(45) Date of Patent: Jun. 10, 2003

(54) SYSTEM AND METHOD FOR SIMULTANEOUS TRANSMISSION OF SIGNALS IN MULTIPLE BEAMS WITHOUT FEEDER CABLE COHERENCY

(75) Inventors: Bo Hagerman, Stockholm (SE); Björn Johannisson, Kungsbacka (SE); Thomas Östman, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 539 days.

(21) Appl. No.: 09/599,974

(22) Filed: Jun. 21, 2000

(51) Int. Cl.$^7$ .................................................. H04B 1/38
(52) U.S. Cl. ..................................... 455/562; 455/13.3
(58) Field of Search ................................. 455/561, 562, 455/13.3, 129, 277.1, 277.2; 342/373, 386, 372; 370/334

(56) References Cited

U.S. PATENT DOCUMENTS

| | | | |
|---|---|---|---|
| 3,906,502 A | * 9/1975 | Connolly | 342/372 |
| 5,115,248 A | 5/1992 | Roederer | 342/373 |
| 5,515,378 A | 5/1996 | Roy, III et al. | 370/95.1 |
| 5,576,717 A | * 11/1996 | Searle et al. | 342/373 |
| 5,812,088 A | * 9/1998 | Pi et al. | 342/373 |
| 5,832,389 A | 11/1998 | Dent | 455/562 |
| 5,924,020 A | 7/1999 | Forssén et al. | 455/129 |
| 6,151,513 A | 11/2000 | Petry et al. | 455/562 |
| 6,377,783 B1 | * 4/2002 | Lo et al. | 455/101 |

FOREIGN PATENT DOCUMENTS

| | | |
|---|---|---|
| DE | 915 35 441 A1 | 3/1997 |
| EP | 0 715 478 A2 | 6/1996 |
| EP | 0 895 436 A2 | 2/1999 |
| WO | WO 95/34102 | 12/1995 |

OTHER PUBLICATIONS

EPO International Search Report dated Jan. 19, 2001.
Ulf Forssén, Jonas Karlsson, Björn Johannisson, Magnus Almgren, Fredrik Lotse and Fredric Kronestedt; *Adaptive Antenna Arrays for GSM900/DCS1800*; IEEE; Mar. 1994; pp. 605–609.
Bo Hagerman and Sara Mazur; *Adaptive Antennas in IS–136 Systems*; IEEE; Apr. 1998; pp. 2282–2286.

* cited by examiner

*Primary Examiner*—Nguyen T. Vo
*Assistant Examiner*—Nghi H. Ly
(74) *Attorney, Agent, or Firm*—Jenkens & Gilchrist, P.C.

(57) ABSTRACT

A telecommunications system and method is disclosed for allowing a base station to simultaneously transmit signals in several beams of a multi-beam antenna configuration. Antenna pattern control is maintained by employing orthogonal polarization orientation for every other beam. For example, the two orthogonal polarization directions can be approximately linear polarization slanted ±45°. To be able to transmit simultaneously in an arbitrary combination of more than one beam, the BS antenna array includes a separate feeder cable for each combination of beams corresponding to a particular polarization, from one feeder per beam to one feeder with all beams of that polarization.

24 Claims, 6 Drawing Sheets

SYSTEM AND METHOD FOR SIMULTANEOUS TRANSMISSION OF SIGNALS IN MULTIPLE BEAMS WITHOUT FEEDER CABLE COHERENCY

BACKGROUND OF THE PRESENT INVENTION

1. Field of the Invention

The present invention relates generally to base stations within cellular systems, and specifically to base stations utilizing multi-beam antenna arrays.

2. Background and Objects of the Present Invention

Up until now, cellular time division multiple access (TDMA) systems have conventionally included base stations (BS's) that utilize either omni or sector antennas (typically 120° coverage per sector). These antennas cover the entire cell without any knowledge of the mobile station's (MS's) position.

To increase the coverage and capacity of future systems, adaptive antenna systems using multi-beam antenna arrays have been developed. The narrow beams of the antenna array can be used to increase the sensitivity of the uplink, and to reduce the interference in both the uplink and the downlink.

In cellular TDMA systems, for each user, it is only necessary to transmit power in the assigned channel or time slot in the actually active spatial area (cell, sector or beam). Therefore, users in the system are allocated channels to limit (minimize) the mutual interference between themselves and other users. The interference level determines the channel reuse pattern in the cellular grid.

Without changing the cellular BS grid including its sector coverage layout, the interference level in the system can be reduced (less interference is received and spatially spread out) by utilizing beam forming methods with narrow beams based on knowledge of the MS's positions. This interference reduction can be used either to achieve increased capacity of the system (i.e., decrease the spatial reuse pattern) or to achieve enhanced quality of the actual communication links (i.e., increased data or speech quality to end user).

A number of proposals for cellular systems employing antenna arrays have been published. Reference is made to the following articles and patents: Forssen et al., "Adaptive Antenna Array for GSM900/DCS1800," Proc. 44th Vehicular Technology Conference, Stockholm, June 1994; Hagerman et al., "Adaptive Antennas in IS-136 Systems," Proc. 48th Vehicular Technology Conference, Ottawa,, May 1998; U.S. Pat. No. 5,515,378 to Roy, III et al.; and PCT International Application WO 95/34102 to Forssen et al., each of which is hereby incorporated by reference. For example, Roy, III et al. describes how capacity can be increased by means of allowing multiple MS's per traffic channel in one coverage area and gives examples of various algorithms. WO 95/34102 to Forssen et al. describes a dual orthogonally polarized microstrip antenna array for use in mobile communication systems.

However, in several TDMA systems, an MS must extract information included within an adjacent time slot or channel, which may be included in a data stream (transmission) aimed for some other MS. For example, in some TDMA systems (IS-136, PDC, GPRS and EDGE), energy must be transmitted on a downlink carrier even though that carrier does not serve an active MS. This may be required to facilitate complexity reduction, to assist the MS in synchronization or to facilitate the scheduling of the air interface recourse. Such requirements limit the ability of cellular TDMA systems to utilize the aforementioned beamforming methods with narrow beams based on the MS's position in order to reduce the interference level.

Specifically, in IS-136 cellular systems, an MS should be able to use training sequences and color codes included in the surrounding adjacent time slots. These adjacent training sequences may be used to enhance the equalizer function, and therefore enhance the performance of the air interface. No power control is allowed in non-active time slots if one of the slots on the carrier is active, i.e., no power control is admitted on a time slot basis in IS-136 Revision A.

In PDC cellular systems, the MS should be able to measure the received signal strength in adjacent slots with the objective to select the best MS antenna for reception during the active slot (2-branch antenna selection diversity in the MS). A maximum power reduction of −8 dB relative to the power level in an active slot is allowed in non-active slots.

Similarly, in GPRS and EDGE cellular systems, an MS must be able to read the uplink state flag transmitted in the downlink to be able to determine if the MS is assigned to use the next uplink time slot for transmission.

As mentioned hereinbefore, a problem arises if one of the above discussed cellular systems utilizes narrow (steerable) beams. Beams that are selected/steered on a time slot basis may spatially steer away for nonactive slots and result in a malfunction.

Therefore, to prevent malfunctions, information can be simultaneously transmitted in several beams of a multi-beam BS antenna configuration. However, due to vector addition of transmitted signals, simultaneous transmission in several beams requires coherent signal paths from the first splitter in the BS up to the antenna array, including feeder cable coherency. The coherency is required for control of antenna pattern characteristics when transmission is directed to more than one beam. Otherwise, the radiation pattern will be uncontrolled and can have significant variations, including possible directions with nulls in the radiation pattern.

Such coherent signal paths are very delicate to achieve in an installed product with several years of expected life time. This kind of solution will require calibration networks that keep track of signals paths and algorithms that compensate for inaccuracies and variations, which both are expensive to introduce in the system.

It is, therefore, an object of the present invention to maintain antenna pattern control when radiating in two or more beams simultaneously.

It is a further object of the present invention to avoid coherency requirements in the feeder cables of a BS antenna arrangement, thereby considerably simplifying and reducing the cost of the system.

SUMMARY OF THE INVENTION

The present invention is directed to systems and methods for allowing a base station to simultaneously transmit signals in several beams of a multi-beam antenna configuration. Antenna pattern control is maintained by employing orthogonal polarization orientation for neighboring beams that are used for simultaneous transmission. For example, the two orthogonal polarization directions can be approximately linear polarization slanted ±45°. To be able to transmit simultaneously in an arbitrary combination of more than one beam, the BS antenna array includes a separate feeder cable for each selected combination of beams corresponding to a particular polarization, from one feeder per beam to one feeder with all beams of that polarization. In the overlapping region between two adjacent beams there may be a shift of signal polarization direction, but signal level will remain at an expected level. Accordingly, there does not exist any coherency requirement between different polarizations.

BRIEF DESCRIPTION OF THE DRAWINGS

The disclosed invention will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

Figure 1:
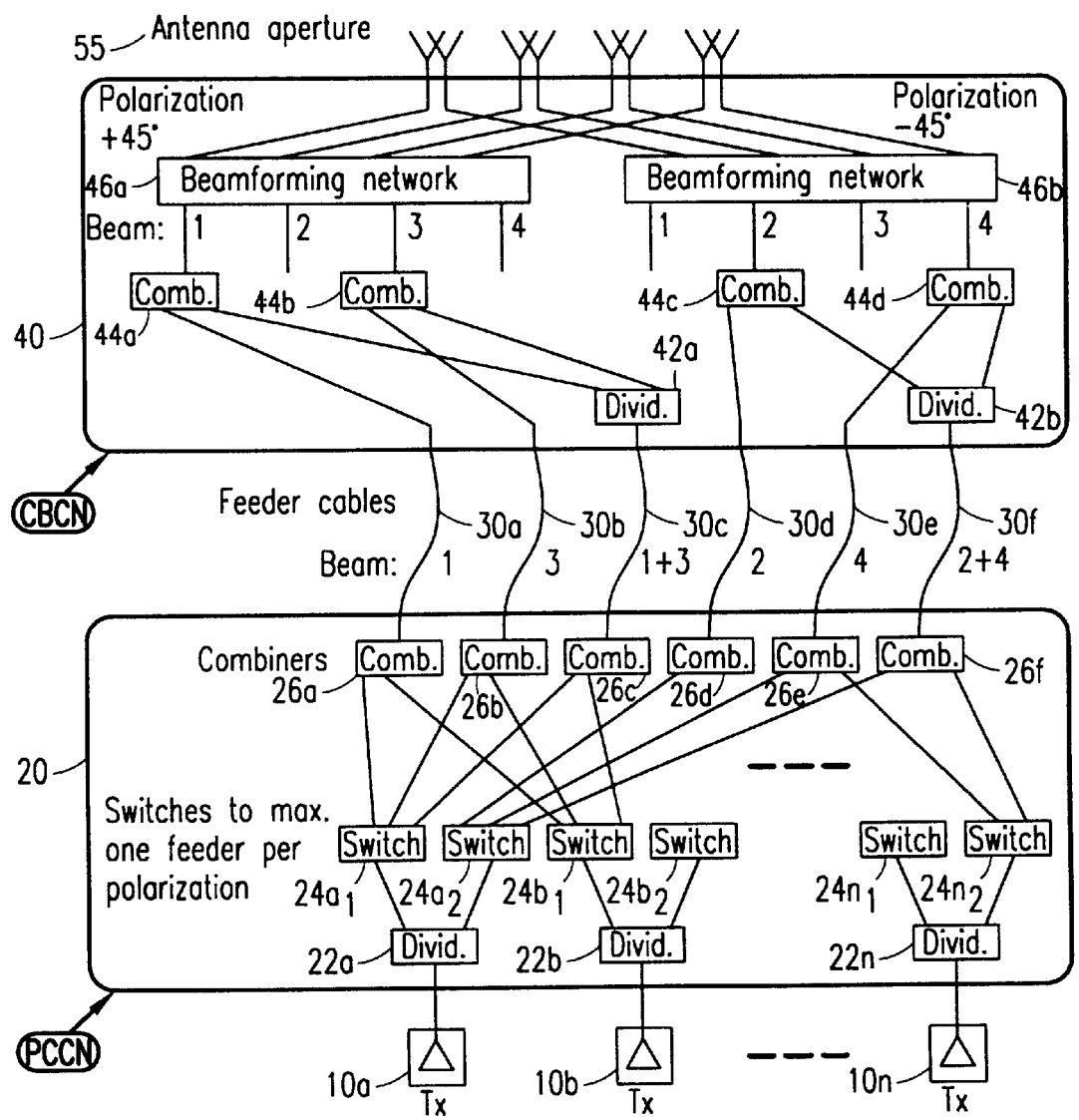
FIG. 1 is a block diagram of a system for simultaneous multiple beam transmission in accordance with preferred embodiments of the present invention.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

In adaptive antenna solutions aimed at reducing the interference level, the conventional sector antennas are replaced by one or several antenna arrays. These antenna arrays typically include at least one antenna aperture consisting of several rows and columns of radiating elements. The antenna array generates a plurality of narrow azimuth beams or lobes via beamports using the full array, where the direction and shape of the antenna beams are determined by a beamforming apparatus connected to the columns of the array. The beamforming apparatus utilizes signal amplitude and phase relations between different columns of the array to create the beams.

As stated hereinbefore, to reduce the interference level, instead of transmitting signals in the entire sector (coverage area), as in conventional base stations (BS's), the narrow beams created by the antenna array can be directed from the BS towards the mobile station (MS). A beam can be either steered directly at the MS or selected from a set of fixed beams. This can be done based on knowledge of the MS's positions. The position information can be obtained by numerous methods, such as, for example, by GPS and/or DOA information. For example, the beam suitable for downlink transmission may be selected or steered based upon information derived from the uplink, such as the Direction of Arrival (DOA) of the received information. For example, the DOA can be an estimate of the direction to the MS or simply an identification of the best uplink beam.

Several approaches can be used to direct the radiated power from an antenna array in a narrow beam. The phase front on the antenna elements corresponding to a beam can be generated at base-band using digital beam forming or at RF using a passive network or phase shifters. Base-band beam forming techniques always require phase coherence all the way to the antenna elements, while passive beam forming networks do not require phase coherence between the radio transmitter and the beam former. However, if multiple beams are transmitted simultaneously, phase coherence between the beams is essential. One example of a passive network is the Butler matrix, which generates a set of orthogonal beams, thus minimizing beam forming loss.

As discussed hereinbefore, several cellular systems with time division components in their multiple access methods require MS's to receive information on adjacent time slots. However, beams that are selected/steered on a time slot basis in many cases may spatially steer away for non-active time slots and result in a malfunction for these systems.

Therefore, with reference now to FIG. 1 of the drawings, a system for simultaneous multiple beam transmission in accordance with embodiments of the present invention is shown. Maintaining antenna pattern control when radiating in two or more beams simultaneously can be accomplished by utilizing orthogonal polarization orientation for every other beam. For example, the two orthogonal polarization directions can be approximately linear polarization slanted ±45°.

Figure 3:
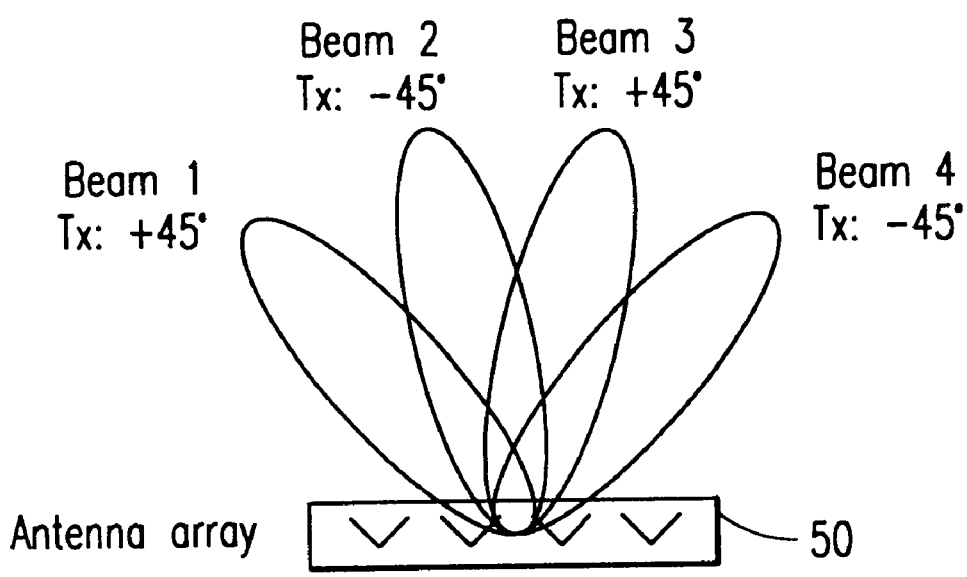
FIG. 3 illustrates an example of a multi-beam configuration using the system shown in FIG. 1 of the drawings.

To be able to transmit an arbitrary combination of more than one beam, for each polarization, there is a separate feeder cable 30 for each combination of beams corresponding to that polarization, from one feeder cable 30 per beam to one feeder cable 30 with all beams of that polarization. As an example, as shown in FIG. 3, in a system having four beams, one polarization (+45°) is used for beams 1 and 3 while the other polarization (−45°) is used for beams 2 and 4.

Therefore, as shown in FIG. 1, in addition to the feeder cables 30a, 30d, 30b and 30e for beams 1, 2, 3 and 4, respectively, there is one feeder cable 30c for transmission into beams 1 and 3 simultaneously, and one feeder cable 30f for transmission into beams 2 and 4 simultaneously. By feeding in the maximum one of feeder cable 30 per polarization, it is then possible to simultaneously radiate in a controlled manner in any combination of the available beams.

In a first embodiment, as shown in FIG. 1, one or more radio transmitters (Tx) 10a, 10b ... 10n, each corresponding to a different carrier frequency, are connected to a Pre-Combining-Carrier-Network (PCCN) 20 in the BS, which is preferably integrated in the BS cabinet. In the PCCN 20, the signals from each Tx 10a, 10b ... 10n are switched to the desired radiation pattern for both polarizations if needed. Feeding both polarizations into the PCCN 20 could either be done with two power amplifiers (PA) per Tx 10, or by splitting the power from one PA. In addition, in the PCCN 20, each signal (time slot or carrier) is directed (routed) to the correct beam, and all simultaneous signals for each beam are combined.

Figure 2:
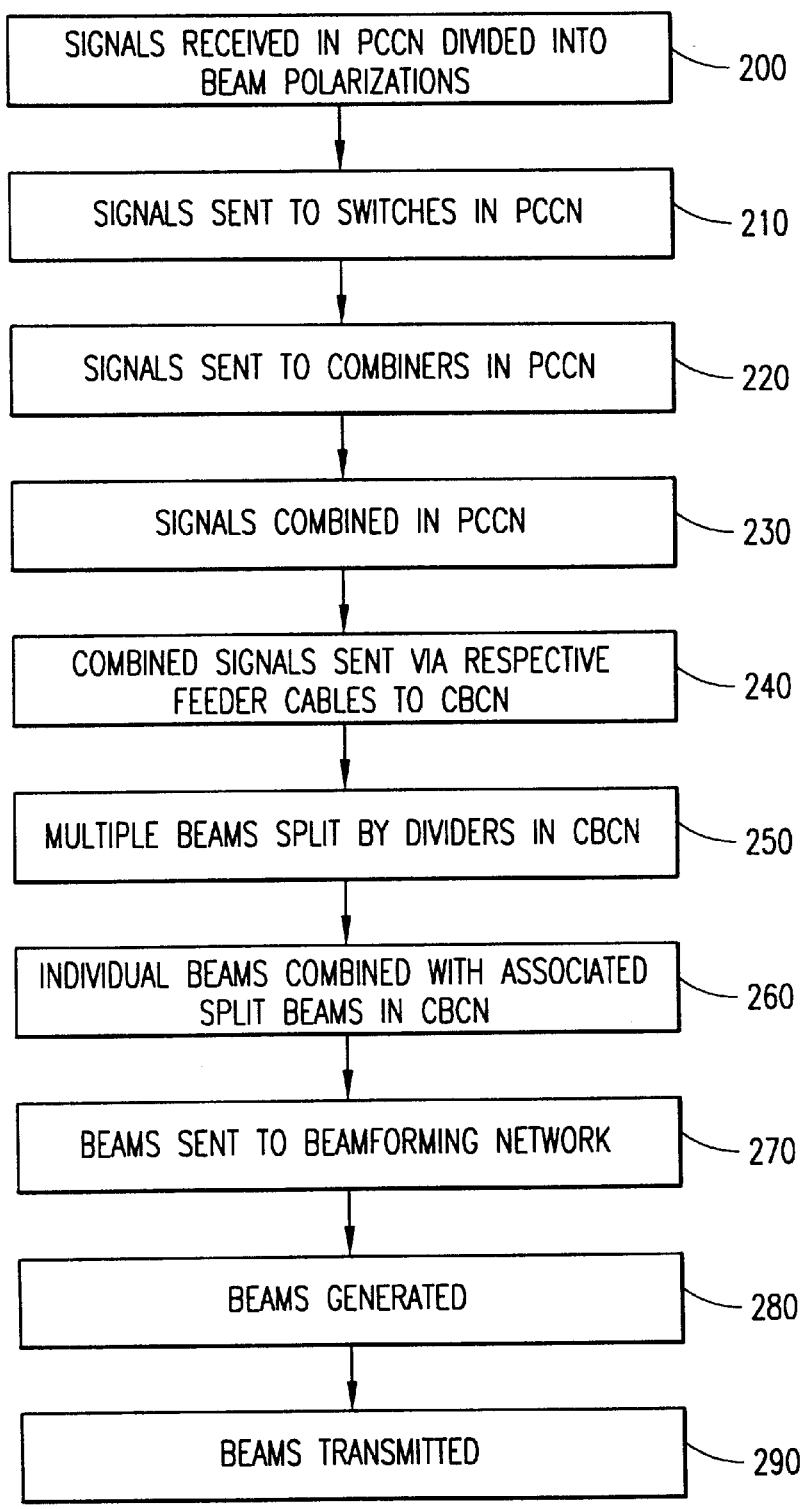
FIG. 2 is a flow chart illustrating the steps for radiating simultaneously in multiple beams using the system shown in FIG. 1 of the drawings.

With reference now to FIG. 2 of the drawings, which will be described in connection with FIG. 1 of the drawings, the signals for the various time slots in each carrier frequency from each Tx 10a, 10b . . . 10n are first divided by a respective divider 22a, 22b 22n in the PCCN 20 into their respective beam polarizations (step 200). Thereafter, the signals for the time slots are sent to their respective switches 24 in the PCCN 20 (step 210). There are two switches $24a_1$ and $24a_2$ for every divider 22a, each switch 24 being associated with a different polarization. For example, assuming a carrier frequency (Tx 10a) has eight time slots, the divider 22a associated with that carrier 10a may divide the power of each of the eight time slots to the first switch $24a_1$ and the second switch $24a_2$.

Each switch 24 sends the signal for each received time slot to a maximum of one combiner 26 (step 220), which serves to combine all of the signals received from the switches 24 into the beam or beam combination associated with that combiner 26 (step 230). Therefore, each combiner 26a–f is associated with a separate feeder cable 30a–f, respectively.

For example, assuming a first switch $24a_1$ associated with a first polarization received the signal for time slots 1 and 2, and the BS had determined that the signal in time slot 1 is to be sent on beam 1 and the signal in time slot 2 is to be sent on beams 1 and 3, the first switch $24a_1$ would send the signal for time slot 1 to the combiner 26a associated with the feeder cable 30a for beam 1, and the signal for time slot 2 to the combiner 26c associated with the feeder cable 26c for beams 1 and 3.

The signals from each feeder cable 30a–f are transmitted from the PCCN 20 to a Coherent-Beam-Configuration-Network (CBCN) 40 (step 240), which is preferably integrated in the antenna enclosure in the BS. For example, the CBCN 40 is preferably mast mounted together with then antenna unit, which includes the antenna array. In the CBCN 40, the signals from the feeders 30a–f are connected coherently via the corresponding beamports to all elements in the antenna array. It should be noted that due to the losses in the switching and combining components in the PCCN 20 it may be advantageous to use multicarrier power amplifiers (MCPA) to amplify the signals in the beams after the PCCN 20. For example, MCPA's may be used to amplify signals between the PCCN 20 and CBCN 40, or prior to entering the beamforming networks 46a and 46b, or the MCPA's can be used for amplifying the signals between the beamforming networks 46a and 46b and the antenna aperture 55.

Initially, the signals from the feeders 30c and 30f containing multiple beams are split into several beams by dividers 42a and 42b, respectively (step 250), e.g., from cable feeder 30c containing beams 1+3 to beams 1 and 3 in order to be transmitted on both beams 1 and 3 simultaneously. The signal paths from the dividers 42a and 42b in the CBCN 40 have to be coherent from the dividers 42a and 42b in the CBCN 40 to the antenna aperture 55 to control the radiation pattern.

Thereafter, the signals from the beams split from the multiple beam are combined by combiners 44a–d with the signals received from the feeder cables 30 for the individual beams to create each individual beam (step 260). Continuing from the previous example, after the divider 42a in the CBCN 40 that is connected to the feeder cable 30c for beams 1+3 divides the signal into beams 1 and 3, the divider 42a sends the signal for beam 1 to the combiner 44a in the CBCN 40 associated with beam 1 and the signal for beam 3 to the combiner 44b associated with beam 3. The combiner 44a for beam 1 combines the signal received from the divider 42a with the signal received from the feeder cable 30a associated with beam 1. Combiner 44b associated with beam 3 combines the signal received from the divider 42a with the signal received from the feeder cable 30b associated with beam 3.

Thereafter, all of the signals for each beam (1, 2, 3 and 4) are sent to a respective beamforming network 46a or 46b (step 270), where the direction and shape of the beams are formed. Each beamforming network 46 is associated with a different polarization. For example, as shown in FIGS. 1 and 3, beams 1 and 3 are linear polarized slanted +45°, while beams 2 and 4 are linear polarized slanted –45°.

Each beamforming network 46 is connected to all elements of the antenna array 50 with the corresponding polarization (shown in FIG. 3) to generate the beams (step 280). Therefore, once generated, the signals for each beam are transmitted from the antenna aperture 55 (shown in FIG. 1) towards the MS's in the cell associated with the BS (step 290).

It should be noted that in the overlapping region between two adjacent beams there may be a shift of signal polarization direction, but the signal power level will remain at an expected level. Accordingly, there does not exist any coherency requirement between different polarizations.

Figure 4:
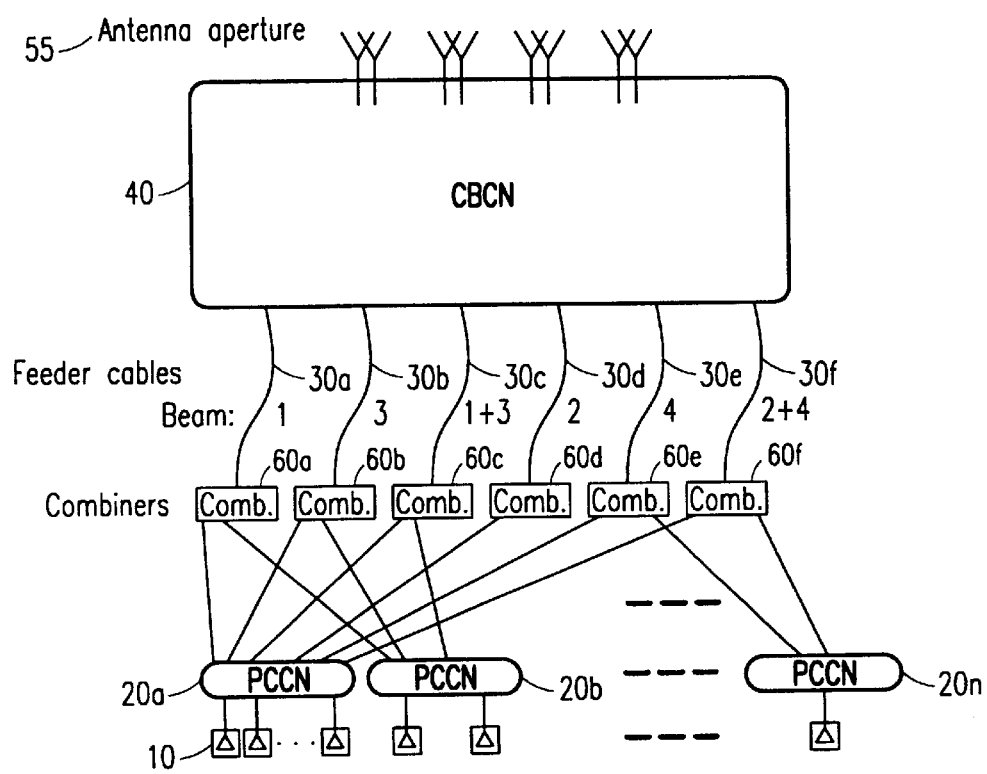
FIG. 4 is a block diagram illustrating a system for simultaneous multiple beam transmission in accordance with an alternative embodiment.

With reference now to FIG. 4 of the drawings, in an alternative embodiment, the PCCN 20 structure may also be suitable in a modular building practice where the outputs from several PCCN units 20a, 20b . . . 20n are combined to one CBCN 40. This modular utilization of PCCN units 20 is a preferred solution for system migration. In this embodiment, the signals from each PCCN 20a, 20b . . . 20n are first combined by additional combiners 60a–f into their respective beams and transmitted via respective feeder cables 30a–f, as discussed above, to the CBCN 40. The PCCN's 20a, 20b . . . 20n in FIG. 4 each have the same structure as that shown in FIG. 1, and each perform the same steps shown in FIG. 2. The only difference is an additional combining step performed by the additional combiners 60a–f in order to combine the signals for each beam before entering the CBCN 40.

Figure 5A:
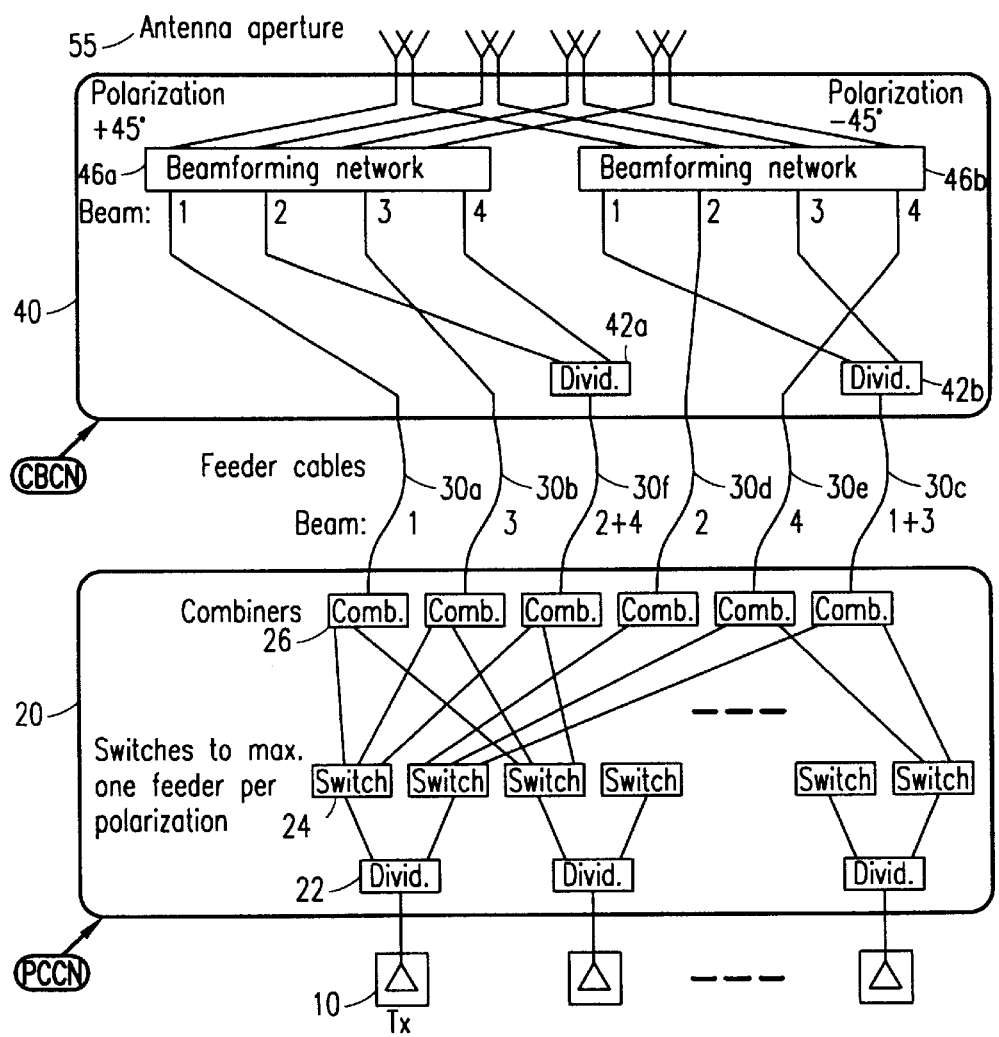
FIGS. 5A and 5B are block diagrams illustrating systems for simultaneous multiple beam transmission in accordance with further alternative embodiments.

With reference now to FIG. 5A of the drawings, another alternative embodiment is illustrated. The difference between the configuration shown in FIG. 1 and that shown in FIG. 5A is that the Coherent-Beam-Confirmation-Network (CBCN) 40 in FIG. 5A does not use combiners, which reduces insertion losses. In comparison with the first type of CBCN 40 shown in FIG. 1, only a limited number of beam combinations per carrier are available for selection. The general PCCN 20 structure and usage in FIG. 5A is the same as that described in connection with FIG. 1. Thus, all previously described solutions and combinations including PCCN 20 and CBCN 40 are legitimate.

The limitation introduced by utilizing a CBCN 40 as shown in FIG. 5A is that the allowed combinations of beams per carrier into the CBCN 40 firstly have to be based on non-adjacent beam sets within the same polarization and secondly only one beam set from each polarization can be selected for transmission.

In the CBCN 40 shown in FIG. 5A, the feeder cables 30a, 30b and 30f for beams 1, 3 and 2+4 are received by the beamforming network 46a that feeds the beams +45°, while the feeder cables 30d, 30e and 30c for beams 2, 4 and 1+3 are received by the beamforming network 46b that feeds the beams –45°. As discussed above, before being sent to their respective beamforming networks 46a and 46b, the signals from the feeders 30f and 30c containing multiple beams are split into several beams by respective dividers 42a and 42b, e.g., from feeder cable 30f containing beams 2+4 to beams 2 and 4 that are received by the +45° beamforming network 46a and from feeder cable 30c containing beams 1+3 to beams 1 and 3 that are received by the −45° beamforming network 46b.

Figure 5B:
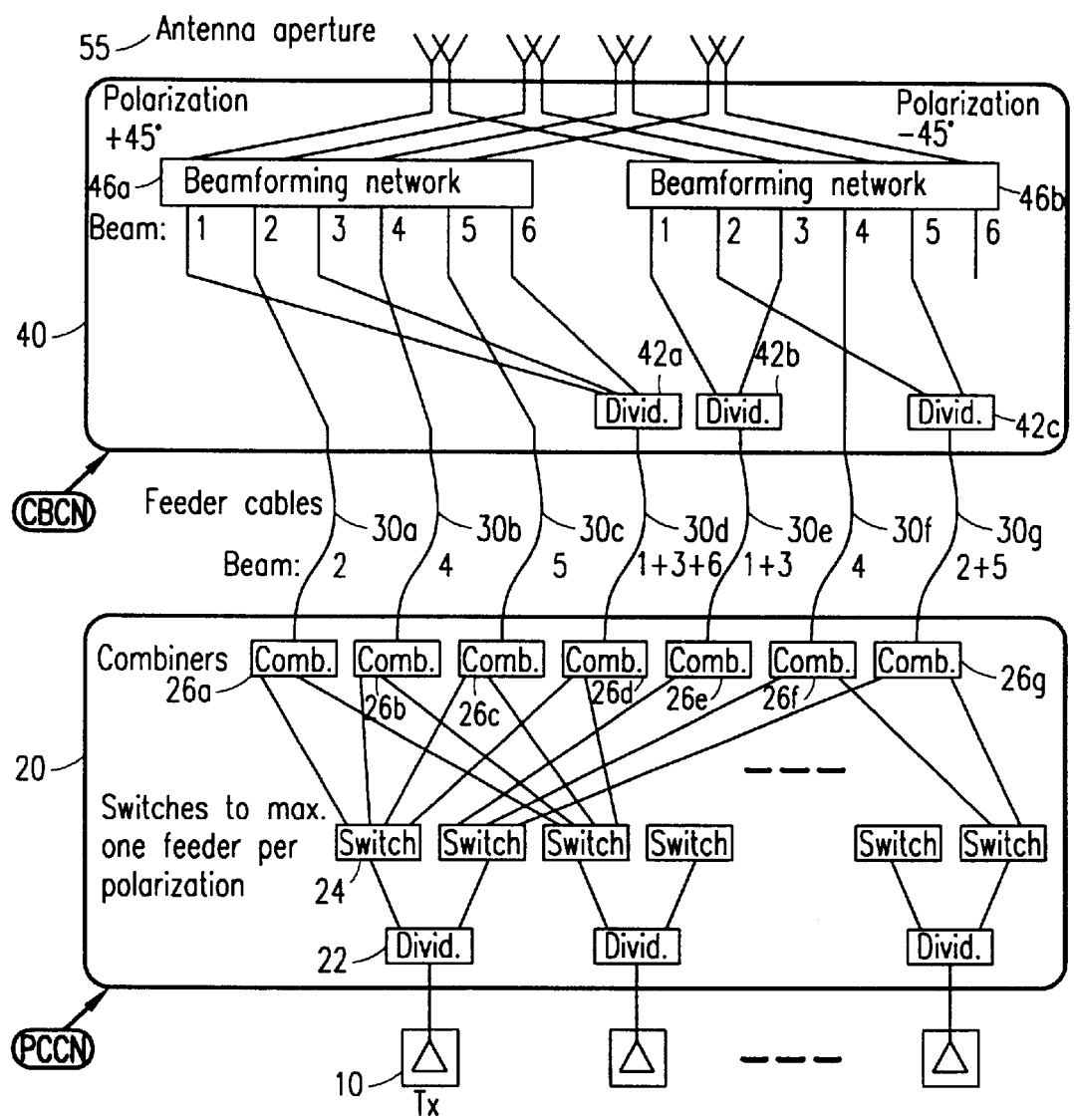

FIG. 5B shows an example of a configuration using the CBCN 40 structure of FIG. 5B with six beams in each polarization, where feeder cables 30a–d from combiners 26a–d in the PCCN 20 to the +45° polarization in the CBCN 40 includes the set of beam 2, beam 4, beam 5 and beams 1+3+6. The feeder cables 30e–g from the combiners 26e–g in the PCCN 20 to the −45° polarization in the CBCN 40 includes the set of beam 4, beams 1+3 and beams 2+5. Again, the signals from the feeders 30d, 30e and 30g containing multiple beams are split into their individual beams by respective dividers 42a, 42b and 42c in the CBCN 40.

By utilizing orthogonal polarization orientation for neighboring beams that are used for simultaneous transmission in any of the above described configurations (FIGS. 1, 4, 5A or 5B), it becomes possible to avoid coherency requirements in the feeder cables of a base station antenna arrangement, thereby considerably simplifying and reducing the cost of the system. As shown, this can be achieved even when multi-carrier transmission is applied. Furthermore, this configuration can be used with several antennas as well as with a single package antenna.

As will be recognized by those skilled in the art, the innovative concepts described in the present application can be modified and varied over a wide range of applications. Accordingly, the scope of patented subject matter should not be limited to any of the specific exemplary teachings discussed, but is instead defined by the following claims.

What is claimed is:

1. A base station capable of simultaneously transmitting at least one signal in at least two beams, comprising:
   a selected one of at least one feeder cable for receiving said at least one signal, each of said at least two beams having a polarization direction associated therewith, said polarization directions of adjacent ones of said at least two beams being substantially orthogonal to each other, each combination of said at least two beams having the same polarization direction being associated with a different one of said at least one feeder cable; and
   a coherent beam configuration network connected to said at least one feeder cable for receiving said at least one signal on said selected feeder cable, said coherent beam configuration network including two beamforming networks for generating said at least two beams, each of said beamforming networks being associated with one of said polarization directions, said at least one signal being sent to said beamforming networks having said polarization direction associated with said selected feeder cable for simultaneous generation of said at least one beam including said at least one signal.

2. The base station of claim 1, wherein said polarization directions are +45° and −45°.

3. The base station of claim 1, wherein said polarization directions are horizontal and vertical.

4. The base station of claim 1, further comprising:
   an antenna array connected to said beamforming networks, said antenna array for simultaneously generating said at least two beams in conjunction with said beamforming networks.

5. The base station of claim 1, wherein said base station is within a time division multiple access cellular system.

6. The base station of claim 1, wherein said coherent beam configuration network comprises at least one divider connected to a respective one of said at least one feeder cable.

7. The base station of claim 6, wherein said selected feeder cable is associated with at least two of said at least two beams having the same polarization direction, said selected feeder cable being connected to said divider, said divider for dividing said received at least two beams into individual beams, each of said individual beams having said at least one signal therein.

8. The base station of claim 7, wherein said coherent beam configuration network comprises a combiner for each of said individual beams, each said combiner being connected to a respective one of said at least one divider and said beamforming network associated with said polarization direction of said individual beams, each said combiner for combining said at least one signal received for said respective individual beam with at least one additional signal received from an additional one of said at least one feeder cable associated with said respective individual beam.

9. The base station of claim 1, further comprising:
   a pre-combining carrier network for receiving said at least one signal and switching said at least one signal towards at least one of said at least two beams, said at least one signal being switched to said selected feeder cable by said pre-combining carrier network.

10. The base station of claim 9, further comprising:
    at least one additional pre-combining carrier network for switching at least one additional signal to said selected feeder cable; and
    a combiner for each said at least one feeder cable, said combiner associated with said selected feeder cable for combining said at least one signal with said at least one additional signal and transmitting said at least one signal and said at least one additional signal on said selected feeder cable.

11. The base station of claim 9, wherein said pre-combining carrier network comprises at least one divider for receiving a respective carrier frequency, a selected one of said at least one divider for dividing said respective carrier frequency into said at least one signal having said polarization direction associated with said selected feeder cable.

12. The base station of claim 11, wherein said pre-combining carrier network comprises two switches for each said at least one divider, each switch being associated with one of said polarization directions, said at least one signal being switched towards said selected feeder cable using the one of said two switches having said polarization direction associated with said selected feeder cable.

13. The base station of claim 12, wherein said pre-combining carrier network comprises a combiner for each said at least one feeder cable, said combiner associated with said selected feeder cable for combining said at least one signal with at least one additional signal received from at least one additional divider.

14. A method for allowing a base station to simultaneously transmit at least one signal in at least two beams of said base station, comprising the steps of:
    switching said at least one signal to a selected one of at least one feeder cable, each of said at least two beams having a polarization direction associated therewith, said polarization directions of adjacent ones of said at least two beams being substantially orthogonal to each other, each combination of said at least two beams having the same polarization direction being associated with a different one of said at least one feeder cable;
    receiving said at least one signal on said selected feeder cable at a coherent beam configuration network within said base station, said coherent beam configuration network including two beamforming networks for generating said at least two beams, each of said beamforming networks being associated with one of said polarization directions; and sending said at least one signal to beamforming networks having said polarization direction associated with said selected feeder cable for simultaneous generation of said at least one beam including said at least one signal.

15. The method of claim 14, wherein said polarization directions are +45° and −45°.

16. The method of claim 14, wherein said polarization directions are horizontal and vertical.

17. The method of claim 14, wherein said step of sending further comprises the step of:

simultaneously generating said at least two beams using an antenna array in conjunction with said beamforming networks.

18. The method of claim 14, wherein said selected feeder cable is associated with two of said at least two beams having the same polarization direction, said selected feeder cable being connected to a divider within said coherent beam configuration network, said step of sending further comprising the step of:

dividing said received two beams into individual beams, each of said individual beams having said at least one signal therein.

19. The method of claim 18, wherein said coherent beam configuration network comprises a combiner for each of said individual beams, each said combiner being connected to said divider and said beamforming network associated with said polarization direction of said individual beams, said step of sending further comprising the step of:

combining, by each said combiner, said at least one signal received for said respective individual beam with at least one respective additional signal received from an additional one of said at least one feeder cable associated with said respective individual beam.

20. The method of claim 14, further comprising the step of:

receiving said at lest one signal at a pre-combining carrier network of said base station, said step of switching being performed by said pre-combining carrier network.

21. The method of claim 20, wherein said step of switching further comprises the steps of:

switching at least one additional signal from at least one additional pre-combining carrier network to said selected feeder cable;

combining said at least one signal with said at least one additional signal using a combiner associated with said selected feeder cable; and transmitting said at least one signal and said at least one additional signal on said selected feeder cable.

22. The method of claim 20, wherein said step of receiving said at least one signal at said precombining carrier network further comprises the steps of:

receiving a carrier frequency including said at least one signal at a respective divider for said carrier frequency; and dividing said carrier frequency into said at least one signal having said polarization direction associated with said selected feeder cable.

23. The method of claim 22, wherein said step of switching further comprises the step of:

switching said at least one signal to said selected feeder cable using one of two switches connected to said divider that is associated with said polarization direction of at least one selected feeder cable.

24. The method of claim 23, further comprising the steps of:

combining said at least one signal with at least one additional signal received from at least one additional divider using a combiner associated with said selected feeder cable; and transmitting said at least one signal and said at least one additional signal on said selected feeder cable to said coherent beam configuration network.

* * * * *